United States Patent [19]
Eichmeier

[11] 3,889,180
[45] June 10, 1975

[54] AIR POLLUTION MEASURING EQUIPMENT

[75] Inventor: Joseph Eichmeier, Munich, Germany

[73] Assignee: Constantin Graf Von Berckheim, Weinheim an der Bergstrasse, Germany

[22] Filed: Dec. 12, 1973

[21] Appl. No.: 426,628

[30] Foreign Application Priority Data
Dec. 16, 1972 Germany.......................... 2261792

[52] U.S. Cl............. 324/33; 73/432 PS; 340/237 S
[51] Int. Cl. .......................................... G01n 27/00
[58] Field of Search....... 324/33, 71 CP; 73/432 PS, 73/28; 340/237 S

[56] References Cited
UNITED STATES PATENTS

| | | | |
|---|---|---|---|
| 3,679,973 | 7/1972 | Smith et al............................ | 324/71 |
| 3,763,428 | 10/1973 | Priest..................................... | 324/71 |

FOREIGN PATENTS OR APPLICATIONS

| | | | |
|---|---|---|---|
| 903,998 | 2/1954 | Germany .............................. | 324/33 |

OTHER PUBLICATIONS

Hasenclever et al., "Neue Methode der Staubmessung . . .," Staub, Vol. 20, No. 7, July 1, 1970, pp. 212–218.

Primary Examiner—Alfred E. Smith
Assistant Examiner—Rolf Hille
Attorney, Agent, or Firm—Michael S. Striker

[57] ABSTRACT

A stream of air whose pollution is to be measured is forced between the plates of a first and second air capacitor having a suitable length and applied voltage for furnishing a first and second measurement signal varying, respectively, as a function of small and large positive ion concentration in the air. A divider circuit divides the second by the first measurement signal. The resultant first output signal is added to a second output signal similarly derived from the measurement of negative ions to furnish the final pollution measuring signal.

8 Claims, 1 Drawing Figure

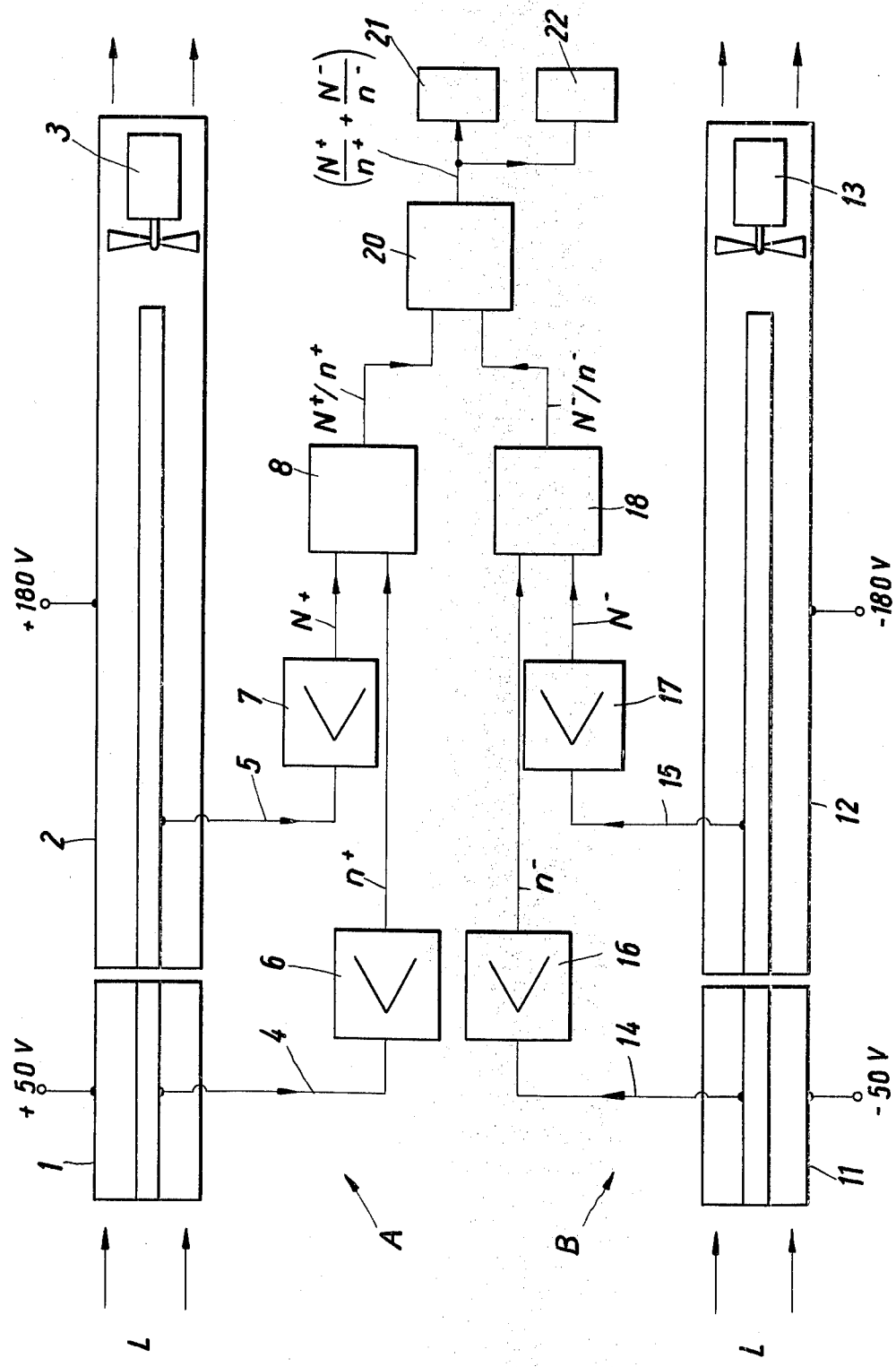

AIR POLLUTION MEASURING EQUIPMENT

BACKGROUND OF THE INVENTION

This invention relates to air pollution measuring equipment.

In known devices of this type, the concentration of dust in the air is used as a measure of air pollution. In these devices the air is sucked through a filter and the thickness of the dust layer remaining on the filter is measured. In another known air pollution measuring method, the air whose pollution is to be measured is compressed, mixed with moist air and the resulting mixture is again allowed to expand. The thickness of the fog which results from condensation forming around dirt particles in the air then serves as an index of the pollution. However these and other known air pollution measuring arrangements and methods only allow very rough measurement. They are very complicated to service and are difficult to use for a continuous measurement.

SUMMARY OF THE INVENTION

An object of the present invention is to furnish an arrangement for measuring the degree of air pollution which can be continuously operated in a relatively simple manner and furnishes more exact measurement values.

In accordance with the present invention, first measurement means are provided for measuring the concentration of small ions of a predetermined sign in the air and furnishing a first measurement signal corresponding thereto. Second measurement means are provided for measuring the concentration of large ions of the same sign in said air and furnishing a second measurement signal corresponding thereto. Further in accordance with the present invention a divider circuit is furnished which has a first input connected to the output of said first measuring means, a second input connected to the output of said second measurement means and a first divider circuit output for furnishing a first output signal corresponding to the ratio of said signals at said inputs. This first output signal furnishes a measure of the degree of pollution.

It can be shown that with increasing air pollution the concentration or density of the small ions in the atmosphere, that is the number of small ions per cubic centimeter, decreases, while the concentration or density of the larger ions, that is the number of larger ions per cubic centimeter increases. For example in clean air, as in the country, concentrations of 600 to 1000 small ions per cubic centimeter may be found and the concentration of the large ions is from approximately 1000 to 2000 ions per cubic centimeter. However, in polluted air, as for example is found in the city, 100 to 300 small ions per cubic centimeter and about 3000 to 10,000 large ions per cubic centimeter may be found on the average. Concentrations of large ions greatly exceeding 10,000 ions per cubic centimeter can be found in streets having heavy traffic, near chimneys, etc. These values are valid for positive ions. The concentration of negative small ions is somewhat smaller. It should be noted that "small ions" are herein taken to refer to ions which on the average comprise 3 to 10 molecules, have one elementry charge, and have a diameter of approximately $5.10^{-8}$ to $1.10^{-7}$ centimeters. Ions which are referred to as large ions herein may have a charge comprising a plurality of elementry charges and a diameter of $1.10^{-7}$ to $1.10^{-5}$ centimeters. These larger ions are, in general, condensation cores with a number of associated small ions. Since the pollution measurement value resulting from the equipment of the present invention is the quotion of two ion concentration values which vary in the opposite direction with increasing pollution, even small differences in air pollution lead to relative large differences in the indicated air pollution value. The resulting measurement is thus very exact. Further, the measuring of ion concentration is very simple and can be conducted on a continuous basis without any difficulty.

In a preferred embodiment of the present invention the first and second measurement means measure the concentration of positive small and large ions.

An even higher accuracy can be reached if a third and fourth measuring means is also provided for measuring the negative ion concentration separately for both large and small ions and furnishing a corresponding fourth and third measurement signal. Second dividing circuit means are also provided which receive the third and fourth measurement signals and furnish a second output signal corresponding to the ratio therebetween. This second output signal as well as the above-mentioned first output signal are applied to the first and second inputs of summing circuit means at whose output is furnished a final output signal which constitutes a very accurate measure of air pollution.

When, in a preferred embodiment of the present invention, the first and second output signals respectively correspond to the ratio of the large to the small ion concentration, the final output signal will increase with increasing air pollution. As mentioned above the change in the final output signal relative to changes in the pollution degree are high.

In a preferred embodiment of the present invention the first and second measurement means comprise a first and second air capacitor through which air flows laminarily at a constant velocity. The capacitors may have planar or cylindrical electrodes and may comprises two or more electrodes. The air stream may be generated by means of an exhaust fan.

In a preferred embodiment of the present invention the two capacitors are arranged one after the other in the direction of flow of air, the first capacitor being shorter and having a lower voltage applied thereto than the second capacitor. The small ions are syphoned off in the transverse electrical field of the first capacitor. The short length and the low voltage are not sufficient in order to cause any substantial portion of the larger ions to be deposited on an electrode. The air which reaches the second capacitor thus contains mostly the larger ions whose charge is then deposited on this second capacitor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE shows a schematic diagram of the present invention.

DESCRIPTION OF THE PREFERRED EMBODIMENTS:

A preferred embodiment of the present invention will now be described with reference to the drawing.

The measurement means which comprise the first and second measurement means for measuring the positive ions both large and small are indicated by reference designation A in the FIGURE while the corresponding arrangement for the negative ions is indicated by reference numeral B. Specifically, the first measurement means comprise a first air capacitor 1 having a relatively short length and having 50 volts applied thereto. (The 50 volts and the length are not to be taken as limiting but merely indicate a preferred embodiment which has been found to operate satisfactorily.) The second measurement means comprise an air capacitor 2 positioned following capacitor 1 in the direction of air flow. In the preferred embodiment of the present invention 180 volts are applied to capacitor 2 which is also considerably longer than is capacitor 1. The direction of air flow is indicated by arrows in the FIGURE. The air flow is generated by means of an exhaust fan 3 which is positioned following capacitor 2 in the direction of air flow and which forces air through the transverse electrical field present between the electrodes of each of the capacitors. As mentioned above a voltage of 50 volts and 180 volts is applied to the outer electrodes of the first and second capacitors, respectively. The inner electrodes of capacitors 1 and 2 are connected to a ground line (not shown) via lines 4 and 5 and amplifiers 6 and 7 respectively. When positive ions are deposited on the inner electrode of capacitor 1 under the influence of its transverse electric field, this charge is conducted from this electrode by means of line 4. As a result, an output signal $n+$ appears at the output of amplifier 6 which is proportional to the concentration of small positive ions in the air. Similarly, charges which accumulate at the inner electrodes of capacitor 2, namely the larger ions, are conducted to ground via line 5 and amplifier 7. A voltage $N+$ then appears at the output of amplifier 7 which is proportional to the concentration of larger positive ions in the air. The output signals $n+$ and $N+$ are applied to the first and second inputs respectively of dividing circuit means, here a divider circuit 8 which is commercially available and may for example be unit AD 530 manufactured by Analog Devices. The output signal, herein referred to as the first output signal, at the output of divider circuit 8 is proportional to the ratio of the signals at the two inputs and, in a preferred embodiment of the present invention, is equal to the ratio of $N+/n+$.

In a preferred embodiment of the present invention third and fourth measurement means respectively including a capacitor 11 and 12 are provided. Capacitor 11 preceeds capacitor 12 in the direction of air flow (again indicated by arrows). The air flow is created by means of an exhaust fan 13. Negative voltages of $-50$ and $-180$ volts are, respectively, applied to capacitors 11 and 12. Capacitors 11 and 12, exhaust fan 13 and the associated circuitry operates in exactly the same fashion as did capacitors 1 and 2, exhaust fan 3 and the circuitry associated therewith. The reference numbers for capacitors 11 and 12 and the associated circuitry are thus the same as those for capacitors 1 and 2 but increased by 10. Signals $n-$ and $N-$ appear at the outputs of amplifiers 16 and 17 respectively. These are applied to second dividing circuit means 18 and whose output appears the signal $N-/n-$. The signal at the output of the second dividing circuit means (the second output signal) thus constitutes a measure of the ratio of the large negative ion concentration to the small negative ion concentration.

The outputs of divider circuits 8 and 18 are connected to a first and second input of a summing amplifier 20. Summing amplifier 20 is a standard operational amplifier. The signal appearing at its output is thus $N+/n+ + n-/n-$. This final output signal constitutes a good measure of air pollution and may be indicated continuously on an indicator 21 (which in a preferred embodiment of the present invention is a digital indicator) and may further be continuously recorded on a recorder 22.

In a preferred embodiment of the present invention, to which of course the present invention is no way limited, cylindrical capacitors were utilized which had an inside diameter of 1.5 centimeters and an outer diameter of 5 centimeters. Capacitors 1 and 11 were 10 centimeters long, while capacitors 2 and 12 were 50 centimeters long. Exhaust fans 3 and 13 created a forced air stream of 1500 cubic centimeters per second in each of the capacitors.

While the invention has been illustrated and described as embodied in specific types of analog circuitry, it is not intended to be limited to the details shown, since various modifications and digital circuits changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Equipment for measuring air pollution, comprising, in combination, first measurement means for measuring the concentration of small ions of a predetermined sign in said air and furnishing a corresponding first measurement signal; second measurement means for measuring the concentration of large ions of the same sign in said air and furnishing a corresponding second measurement signal; and first dividing circuit means having a first input connected to said first measurement means, a second input connected to said second measurement means and a first dividing circuit output, for furnishing a first output signal corresponding to the ratio of said signals at said first and second inputs at said first dividing circuit output, said first output signal constituting a measure of said air pollution.

2. Equipment as set forth in claim 1, wherein said first measurement means measures the concentration of positive small ions and said second measurement means measures the concentration of positive large ions.

3. Equipment as set forth in claim 1, wherein said first and second measurement means respectively comprise a first and second air capacitor, each having a first and second electrode; further comprising means for creating a forced air stream of air the pollution of which is to be measured, between said electrodes of said first and second capacitors.

4. Equipment as set forth in claim 3, wherein said second air capacitor is arranged following said first air capacitor in the direction of flow of said forced air stream.

5. Equipment as set forth in claim 4, wherein the length of said second air capacitor is substantially greater than the length of said first air capacitor.

6. Equipment as set forth in claim 5, further comprising means for applying a first voltage across said first and second electrodes of said first air capacitor, and means for applying a second voltage substantially exceeding said first voltage to said first and second electrodes of said second air capacitor.

7. Equipment as set forth in claim 2, further comprising third measurement means for measuring the concentration of negative small ions in said air and furnishing a corresponding third measurement signal; fourth measurement means for measuring the concentration of negative large ions in said air and furnishing a corresponding fourth measurement signal; second dividing circuit means having a first input connected to the output of said third measurement means, a second input connected to the output of said fourth measurement means and a second dividing circuit output, for furnishing a second output signal corresponding to the ratio of said signals at said first and second input at said second dividing circuit output; and summing circuit means connected to said first and second dividing circuit outputs for furnishing a final output signal corresponding to the sum of said first and second output signal, said final output signal constituting an improved measurement of said air pollution.

8. Equipment as set forth in claim 7, wherein said first dividing circuit means comprise a dividing circuit for dividing said second measurement signal by said first measurement signal, whereby said first output signal varies as a function of the ratio of the large positive ion concentration to the small positive ion concentration; and wherein said second dividing circuit means comprise second dividing circuit means for dividing said fourth measurement signal by said third measurement signal, whereby said second output signal constitutes a measure of the ratio of the negative large ion concentration to the negative small ion concentration.

* * * * *